United States Patent

Baeslack

[15] 3,686,753
[45] Aug. 29, 1972

[54] ELECTRICAL WIRE CUTTING AND STRIPPING TOOL

[72] Inventor: Gerhard Baeslack, 1850 Billingsly Terrace, Bronx, N.Y. 10453

[22] Filed: June 29, 1970

[21] Appl. No.: 50,842

[52] U.S. Cl. .................................................30/90.8
[51] Int. Cl. ..............................................H02g 1/12
[58] Field of Search............30/90.1, 90.4, 90.8, 91.1, 30/91.2; 81/9.5 R, 9.5 B, 9.5 C

[56] References Cited

UNITED STATES PATENTS

| 2,676,399 | 4/1954 | Clearwater | 30/91.1 X |
| 608,919 | 8/1898 | Sell | 81/9.5 R |
| 1,471,593 | 10/1923 | Davis | 81/9.5 R |
| 552,490 | 12/1895 | Benecke | 30/90.6 X |

FOREIGN PATENTS OR APPLICATIONS

| 1,000,079 | 1/1957 | Germany | 30/91.1 |
| 533,428 | 9/1956 | Germany | 30/91.1 |
| 1,080,647 | 4/1960 | Germany | 30/90.7 |

*Primary Examiner*—Robert C. Riordon
*Assistant Examiner*—Roscoe V. Parker, Jr.
*Attorney*—Allison C. Collard

[57] ABSTRACT

An electrical wire stripping and cutting tool particularly adapted for stripping the insulation from Romex wire and the like, having a scissor-like tool including a cutting blade disposed on the end thereof over an offset guideway for permitting the cable to by guided through the guideway during the stripping operation. A means is also provided for controlling the depth of the cut of the blade.

2 Claims, 3 Drawing Figures

PATENTED AUG 29 1972

3,686,753

GERHARD BAESLACK

*signature*

ATTORNEY

ELECTRICAL WIRE CUTTING AND STRIPPING TOOL

This invention relates to a new and improved electrician's tool for cutting and stripping insulation from electrical cables and the like.

More specifically, this invention relates to an improved electrical tool particularly adapted for cutting and stripping Romex cable and the like, quickly and efficiently.

Cutting tools particularly adapted for electrical work generally consists of tools similar to a pair of pliers having handles for opening and closing jaws which contain cutting blades and the like. Some of these conventional tools include blades having graduated openings for stripping the insulation from single conductors of varying sizes. For electrical cables which include two conductors jacketed by an insulation, many of these conventional tools cannot be readily adapted for quickly and efficiently removing the insulation to separate the individual conductors.

Accordingly, the present invention provides an improved electrical wire tool in the form of a pair of pliers having handles for opening and closing jaws which include on one jaw, an adjustable cutting blade disposed over a guideway, offset from the axis of the tool. The depth of the cutting blade as well as its relative position can be adjusted with respect to the guideway. The angle of the cutting blade can be maintained relatively constant despite the opening and closing of the jaws of the tool during its operation.

It is therefore, an object according to the present invention to provide an improved electrical cutting tool particularly adapted for multi-conductor electrical cables.

It is another object according to the present invention to provide an improved cutting tool having an offset guideway for receiving a multiconductor electrical cable.

It is still another object according to the present invention to provide an electrical cutting tool which is simple in design, inexpensive in cost and reliable in operation.

Other objects and features of the present invention will become apparent from the following detailed description considered in connection with the accompanying drawing which discloses an embodiment of the invention. It is to be understood, however, that the drawing is designed for the purpose of illustration only and not as a definition of the limits of the invention.

In the drawing, wherein similar reference characters denote similar elements throughout the several views.

Figure 1:
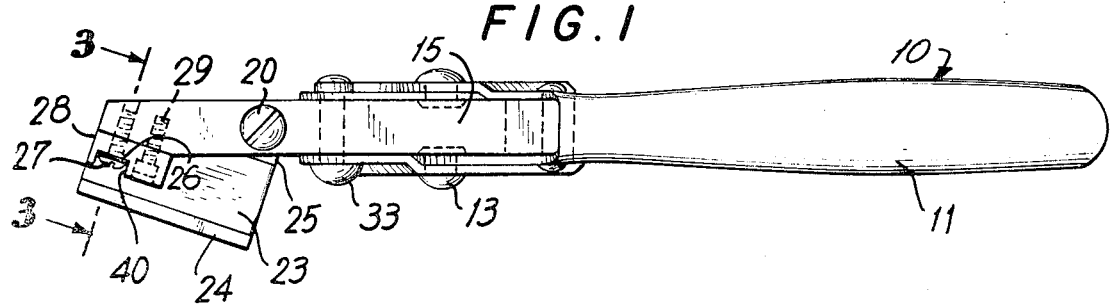
FIG. 1 is a top plan view of the electrical cutting tool of the invention.
Figure 2:
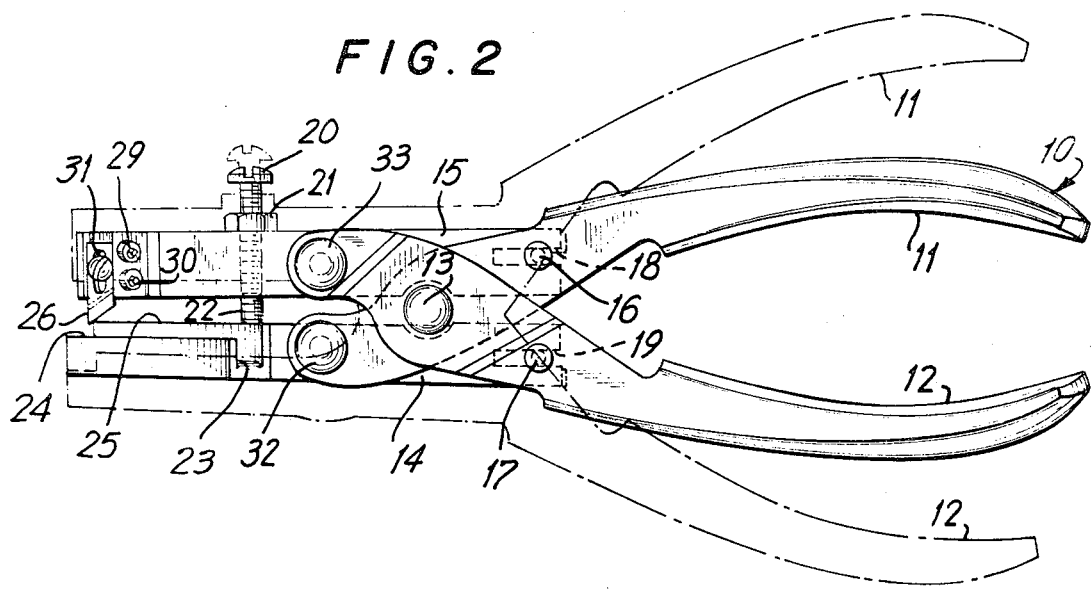
FIG. 2 is a side plan view of the electrical cutting tool of the invention; and, FIG. 3 is a cross-sectional view taken along section 3—3 of FIG. 1.
Figure 3:
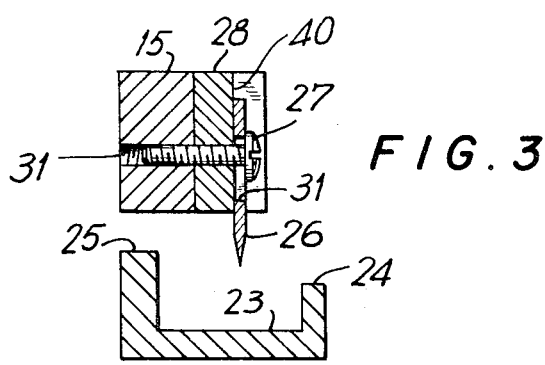

Referring to the Figures, there is shown the electrical cutting tool of the invention generally designated as 10 consisting of a pliers' type instrument having handles 11 and 12 which are pivoted at axle 13 and include jaw members 14 and 15. The back end of jaw member 15 includes a slot 18 which slidably moves across pin 16 inserted through handle 11. Likewise, the back end of jaw member 14 includes a similar slot 19 for slidable movement across pin 17. Pin 17 is inserted through handle 12.

At the forward end of handle 11 is a rivet 32 which passes through a slightly larger aperture in jaw 14. Similarly, at the end of handle 12 is a rivet 33 which also passes through a slightly larger hole in jaw 15 so that the opening and closing of handles 11 and 12 will cause jaw members 14 and 15 to remain substantially parallel with respect to each other. At the end of jaw member 15 is mounted a blade holder 28 secured at an offset angle with respect to the end of jaw member 15 by means of fastening screws 29 and 30. A vertical slot 40 is provided in blade holder 28 in order to receive a blade 26. Blade 26 includes an elongated slot 31 for receiving a screw 27 which secures the blade in the blade holder and jaw 15. Screw 27 is threadably engaged into hole 31.

Jaw member 15 also includes a height adjustment screw 20 having its end 22 for engagement with the top surface of jaw member 14. A locking nut 21 permits screw 20 to be locked in jaw 15 for a permanent adjustment.

Disposed at the end of jaw member 14 is a cable guideway 23 having an outer flange 24 and an inner flange 25. Guideway 25 is also offset from the axis of jaw member 14 in order to permit a multiconductor electrical cable to slide along the guideway without interference by the mechanism of the tool.

In actual operation, the jaws of the cutting tool of the invention are opened by opening handles 11 and 12 to permit an insulated electrical cable, such as a piece of Romex wire, to be inserted into guideway 23. Blade 26, which is disposed above guideway 23, is shown directed along the center line of the guideway so that when the jaws of the tool are closed by closing handles 11 and 12, blade 26 will drop into guideway 23 and cut along the center portion of the cable.

Blade 23 is inclined to provide a linear cutting edge so that as the insulated electrical cable is pulled along guideway 23 in a direction away from handles 11 and 12, the blade will continuously cut away the insulation as desired.

Blade 26 may be raised or lowered by unloosening adjustment screw 27 and sliding the blade within slot 40 of blade holder 28. Likewise, blade holder 28 can be shifted to move blade 26 to the left or right of the center line of slot 23 by unloosening screws 29 and 30 and inserting spacers or shims between blade holder 28 and the end of jaw member 15. The depth of cut can also be adjusted by suitable adjustment to screw 20 mounted through jaw member 15.

While only a single embodiment of the present invention has been shown and described, it will be obvious that many changes and modifications may be made thereunto without departing from the spirit and scope of the invention.

I claim:

1. A cutting tool for stripping insulation material from flat, three wire, electrical cable having a rectangular-shaped cross-section, inside an electrical outlet box, comprising:
    a pair of handles, pivotably coupled to each other so as to form a pliers-like holder for the cutting tool;
    a first jaw member, having a horizontally disposed slot disposed perpendicular to the longitudinal axis of said first jaw member, pivotably coupled to one of said pair of handles;

a second jaw member, having a horizontal elongated slot disposed perpendicular to the longitudinal axis of said second jaw member, pivotably coupled to the other of said pair of handles and disposed adjacent and parallel to said first jaw member;

a pair of horizontally-disposed, cylindrically-shaped pins, affixed to said pair of handles, and disposed in said slots provided in said first and second jaw members, so that said first and second jaw members are displaced vertically upwardly and downwardly parallel to each other when said pair of handles are opened and closed;

an inclined, pointed cutting blade, having an elongated mounting hole provided therein so as to be movable vertically upwardly and downwardly with respect to said first jaw member, mounted on the end of said first jaw member, and disposed downwardly towards said second jaw member, for piercing the electrical insulation material on the electrical cable;

a threaded screw, threadably disposed through said first jaw member perpendicular to said second jaw member, for engaging said second jaw member when said pair of handles are closed, and thereby limiting the movement of said first and second jaw members with respect to each other and the depth of penetration of said cutting blade into the electrical insulation material; and a U-shaped channel, having a rectangular cross-sectional shape, and including an external edge and an internal edge having a height greater than said external edge, integrally formed with said second jaw member, and positioned offset from the longitudinal axis of said second jaw member, for slidably receiving the electrical cable and guiding the cutting blade along the length of the cable, said cutting blade being mounted on said first jaw member so that it is disposed at the forward end of said channel between said internal and external edges, the point of said blade being disposed between said internal and external edges in said channel when said pair of handles are closed.

2. The cutting tool as recited in claim 1, wherein one side of the other end of said first jaw member is provided with an obliquely inclined vertically disposed surface, wherein said blade mounting means comprises an elongated rectangular-shaped member affixed by first and second screws to said oblique surface on said first jaw member, and having a vertically disposed channel provided therein for receiving said cutting blade, said blade being fastened in said channel by a screw disposed through said elongated blade hole and threadably engaging said rectangular mounting member and said first jaw member.

* * * * *